(12) United States Patent
Silver et al.

(10) Patent No.: US 8,469,508 B2
(45) Date of Patent: Jun. 25, 2013

(54) DECORATIVE SELECTABLE ARMS WITH BAYONET CLIP ATTACHMENT OF ARMS TO EYEGLASS FRAMES

(75) Inventors: Max A. Silver, Woodway, TX (US); Werner Blumenthal, Miami, FL (US)

(73) Assignee: Silver Global Manufacturing LLC, Waco, TX (US)

( * ) Notice: Subject to any disclaimer, the term of this patent is extended or adjusted under 35 U.S.C. 154(b) by 117 days.

(21) Appl. No.: 13/066,170

(22) Filed: Apr. 8, 2011

(65) Prior Publication Data

US 2012/0075572 A1    Mar. 29, 2012

Related U.S. Application Data

(63) Continuation-in-part of application No. 12/924,228, filed on Sep. 23, 2010, now abandoned.

(60) Provisional application No. 61/429,613, filed on Jan. 4, 2011.

(51) Int. Cl.
   *G02C 11/02*  (2006.01)
(52) U.S. Cl.
   CPC ...................... *G02C 11/02* (2013.01)
   USPC .............................. 351/52; 351/121
(58) Field of Classification Search
   CPC .......................................................... G02C 11/02
   USPC .......... 351/41, 51, 52, 111–123, 153; 16/228
   See application file for complete search history.

(56) References Cited

U.S. PATENT DOCUMENTS

| | | | |
|---|---|---|---|
| 2,842,028 A | 7/1958 | Evanston, III | |
| 4,755,042 A | 7/1988 | Anger | |
| 4,958,923 A | 9/1990 | Rosenson | |
| 5,033,836 A | 7/1991 | Aoyama | |
| 5,517,258 A | 5/1996 | Naito | |
| 6,652,093 B1 | 11/2003 | Lamy | |
| 7,261,409 B1 | 8/2007 | Taber | |
| D625,751 S * | 10/2010 | Chow | D16/323 |
| 2004/0160570 A1 * | 8/2004 | Polovin | 351/111 |
| 2005/0036103 A1 * | 2/2005 | Bloch | 351/116 |
| 2011/0051074 A1 * | 3/2011 | Arnell | 351/116 |

FOREIGN PATENT DOCUMENTS

| | | |
|---|---|---|
| FR | 2816072 | 5/2002 |
| WO | WO 97/44699 | 11/1997 |
| WO | WO 98/23994 | 6/1998 |
| WO | WO 2009/052705 A1 | 4/2009 |

* cited by examiner

*Primary Examiner* — Huy K Mai
(74) *Attorney, Agent, or Firm* — Melvin K. Silverman (57) ABSTRACT

An eyeglass frame system, comprising an eyeglass securing front frame portion; a pair of temple-contacting side members, each member having a proximal end and a distal end, the proximal end of each secured by a pivotal connection to a respective outermost portion of said front frame portion, said at least one of said side members having inner and outer vertical surfaces thereof, said pivotal connection effected at a first end of a male element of a bayonet clip, a second end thereof defining a plurality of projecting prongs. The system also includes female elements complemental to said male elements. Female elements are formed integrally with an inner surface at each proximal end of said temple-contacting side members. Said male and female members may be selectably engaged or disengaged from each other through the application of pressure on the male elements transversely to the axis of said temple-contacting members.

9 Claims, 9 Drawing Sheets

DECORATIVE SELECTABLE ARMS WITH BAYONET CLIP ATTACHMENT OF ARMS TO EYEGLASS FRAMES

REFERENCE TO RELATED APPLICATIONS

This application claims the benefit under 35 USC 119(e) of provisional patent application Ser. No. 61/429,613, filed Jan. 4, 2011. This application is also a continuation-in-part of application Ser. No. 12/924,228, filed Sep. 23, 2010 and also claims the benefit under 35 USC 120 and 365(c) of application Ser. No. 12/924,228, filed Sep. 23, 2010, and PCT Application No. PCT/US2011/000356, filed Feb. 26, 2011, respectively, all three of which are hereby incorporated by reference in their entirety for all purposes.

THE FIELD OF THE INVENTION

The present invention relates generally to the field of eyeglasses and sunglasses worn for recreational and other activities. More particularly, this invention pertains to foldable eyeglass frames having selectable temple pieces and further having selectable decorative ornamentation displayable on the temple pieces of the frame.

BACKGROUND OF THE INVENTION

It is known in the prior art to embellish such eyeglass frames by providing decorative elements on the side pieces, such side pieces herein termed temple frames. It is also known in the art to select eyeglass frames according to their decorative elements so as to match the graphics of apparel worn by the user or of particular interests to the user.

As examples, U.S. Pat. No. 6,652,093 and PCT Publications WO 98/23994, WO 97/44699 and WO 09/052705 each describe an eyeglass frame structure comprising a decorative element of a temple frame that is mounted in a manner such that the decorative element can rotate or slide with respect to fixed parts of the temple frame. For various reasons, the structures taught therein are not cost-effective, durable, or convenient to use.

Additionally, U.S. Pat. No. 2,842,028 teaches a plastic eyeglass frame having strengthening or decorative inlays permanently fixed into a rectangular cut channel disposed in a temple frame by adhesive.

U.S. Pat. No. 5,033,836 describes an eyeglass frame including a lens frame, having replaceable ornamental lateral extensions to which the temple frame is attached by a hinge.

U.S. Pat. No. 4,958,923 teaches a system in which the temple pieces may be slip-or-pressure-fit over extension elements from the eyeglass frame. However, such temple pieces are not proportioned for ease of removal from or re-attachment to the extension elements of the eyeglass frame.

U.S. Pat. No. 7,261,409 elaborates the teaching of U.S. Pat. No. 6,652,093 in which a decorative element is axially secured within a longitudinal outer channel of a temple piece.

With respect to the novel hinge aspect reflected in my invention, French Patent No. FR 2816072 (2002) to Beausoleil, entitled Spectacle Frames Spring Loaded Hinge with Spring Tension Adjuster in Form of Screw in Closed End of Sleeve Containing Spring and Rod, teaches a spring loaded hinge for an eyeglass frame hinge, however, the method of operation of Beausoleil is fundamentally different from that of my invention in that a rotatable ball rod is used to apply axial pressure to a second rod which is itself spring loaded, which in turn applies pressure through an intermediate element to the axle of an eyeglass frame. The eyeglass frame hinge in my system, as is set forth more fully below, employs a single compression spring which provides appropriate force upon a single co-axial linear rod, the end of which defines a journal which surrounds the eyeglass frame axle, which elements are provided within a plastic molded casing. As such, my hinge is both simpler to manufacture, more cost-effective and more reliable in operation.

Other eyeglass hinge frame constructions which involve the use of an internal spring include U.S. Pat. No. 4,755,042 (1988) to Anger; and U.S. Pat. No. 5,517,258 (1996) to Naito. Neither of these systems provide for an arrangement that is capable of encapsulation within a casing at defining a portion of a press-fit insertion into a complemental structure integrally formed against each proximal end of the temple pieces of the eyeglass system.

One disadvantage of these prior art eyeglass frames is the inability to readily interchange decorative designs in or of the temple frames. Users concerned with using eyeglasses as a fashion accessory consider this a significant shortcoming of the prior art, requiring the purchase of additional eyeglass frames for the users to effectively coordinate their decorative eyeglasses with their multiple pieces of apparel.

What therefore is lacking in the art is an eyeglass frame with rapidly interchangeable decorative inserts or portions that can be readily installed upon and removed from the temple frame without the use of tools other than the user's hands, which forms a part of the temple frame itself, or in which the temple frame itself may be easily changed. Such decorative inserts, elements, or frames preferably comprise separate, inexpensive and interchangeable parts available in a wide variety of decorative patterns, textures, colors or other selectable variable ornamental features.

SUMMARY OF THE INVENTION

An eyeglass frame system, comprising an eyeglass securing front frame portion; a pair of temple-contacting side members, each member having a proximal end and a distal end, the proximal end of each secured by a pivotal connection to a respective outermost portion of said front frame portion, said at least one of said side members having inner and outer vertical surfaces thereof, said pivotal connection effected at a first end of a male element of a bayonet clip, a second end thereof defining a plurality of projecting prongs. The system also includes female elements complemental to said male elements. Female elements are formed integrally with an inner surface at each proximal end of said temple-contacting side members. Said male and female members may be selectably engaged or disengaged from each other through the application of pressure on the male elements transversely to the axis of said temple-contacting members.

It is therefore an object of this invention to provide a system for decorating a temple piece of an eyeglass frame and providing a sturdy and removably engagable decorative portion to the temple piece of an eyeglass frame system.

Another object is to provide a means for decoration of an eyeglass frame system in which the integration of the decorative portion may be accomplished by a pressure fit engagement between respective portions of the temple piece and an extension of the eyeglass frame.

A further object is to provide a system of the above type having a novel hinge structure that provides for selectable removability of the temple-contacting side members from the eyeglass-securing front frame portion of the system.

It is another object to provide a system for easily changing the graphic appearance of the outside of the temple-contacting side members of the system.

Further objects, features and advantages of the present invention will become apparent from the hereinafter specification and claims considered in connection with the accompanying drawings, illustrating the preferred embodiment of the invention.

DETAILED DESCRIPTION OF THE INVENTION

Figure 1:
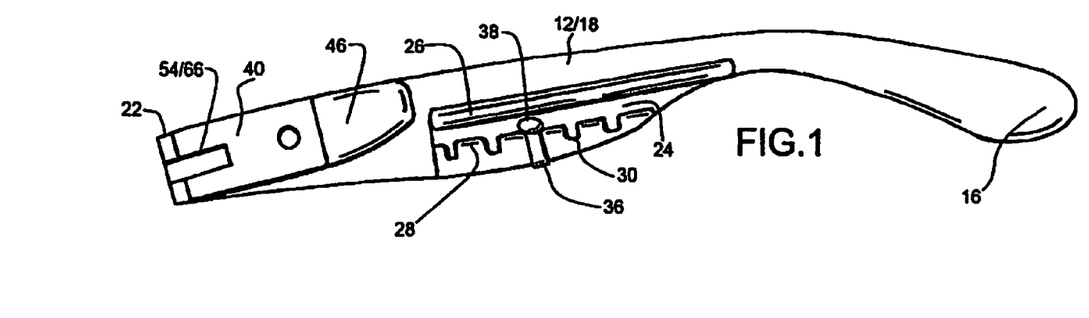
FIG. 1 is an elevational view of an inner surface of a temple contacting member of the present eyeglass frame system.
Figures 2, 3:
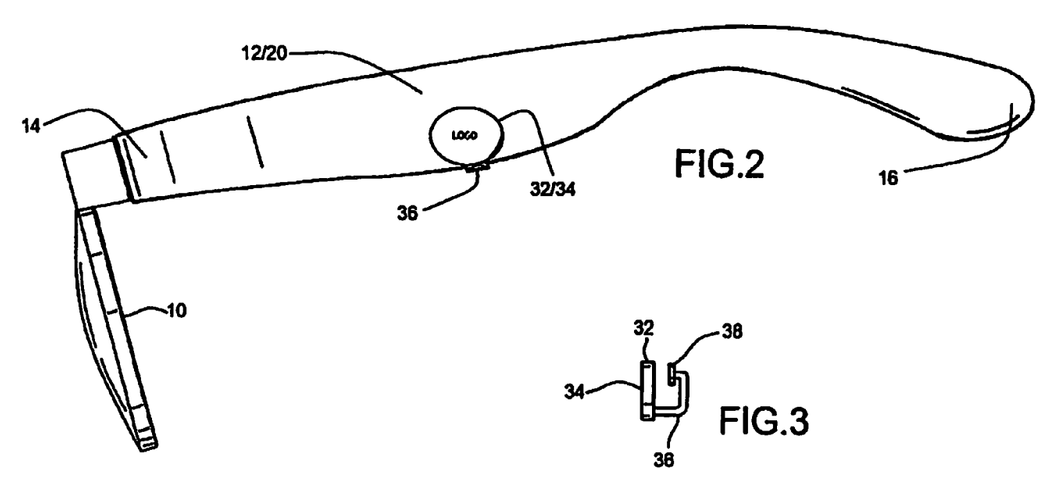
FIG. 2 is a side elevational view of an outside surface thereof, also showing the eyeglass securing front frame portion of the system.
FIG. 3 is a side view of a representative ornament which may be affixed to at least one contacting side member, as is set forth below.
Figure 4:
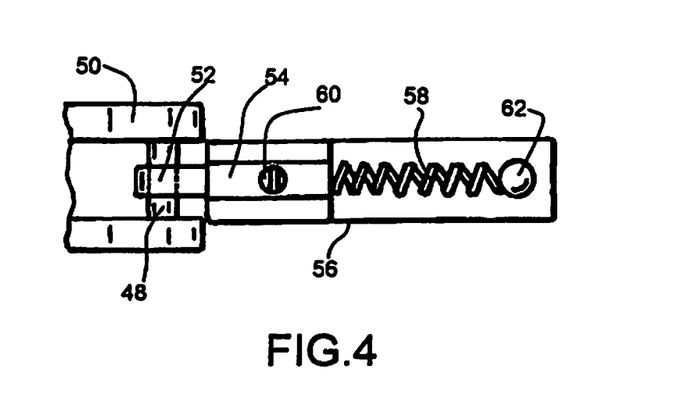
FIG. 4 is an enlarged view of the hinge assembly including the rotatable communication of the temple side members with the front frame portion.
Figure 5:
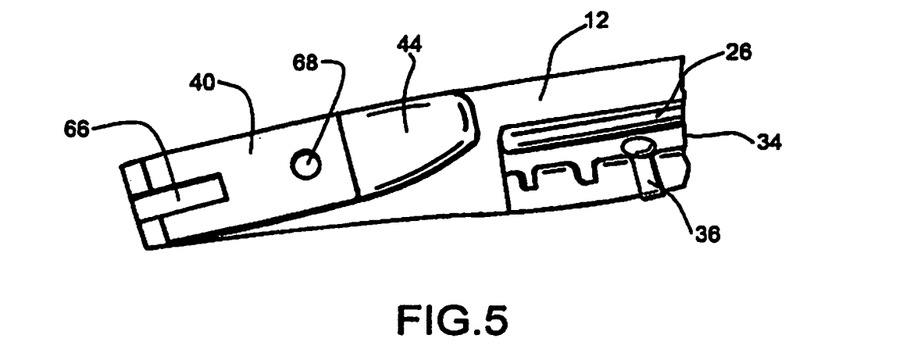
FIG. 5 is an enlarged view of the proximal portion of the view of FIG. 1.
Figure 6:
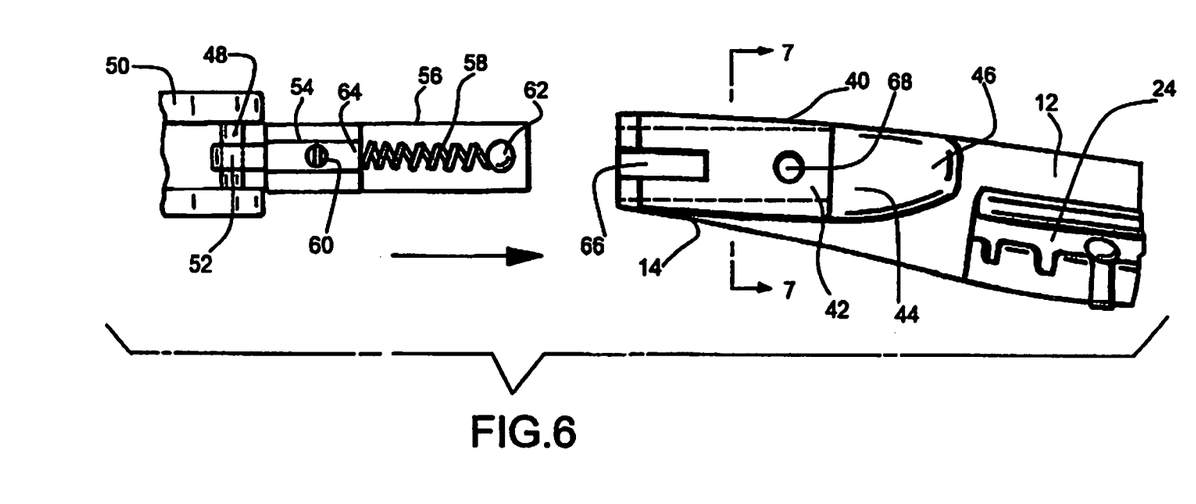
FIG. 6 is an aggregate view shown in the relationship between the mechanism of FIG. 4 and that of FIG. 5.
Figure 7:
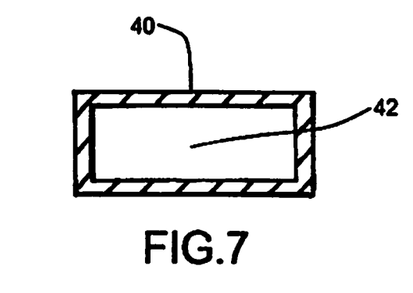
FIG. 7 is a cross-sectional view taken along Line 7-7 of FIG. 6 showing the interior cavity within the hinge carrier formed integrally of the proximal end of each temple side member.

With reference to FIG. 2, the inventive eyeglass frame system may be seen to include an eyeglass securing front frame portion 10 and a pair of temple contacting side members 12, each of which include a proximal end facing said front frame 10 and a distal end 16 positioned near an ear of the user, each temple contacting side member 12 which is characterized by a vertical inner side 18 (see FIG. 1) and outer side 20. The temple side members 12 are secured to the eyeglass securing front frame 10 by a pivotal connection 22 as is more fully described below.

As may be noted in FIG. 1, at least one of each temple contacting side member is provided with a serrated track 24 which is defined by an elongate linear ridge 26 and a surface 28 including a plurality of slots 30.

In FIGS. 2 and 3 are shown a selectable ornament 32, as may be noted in FIG. 3, exhibits a substantially U-shaped front-to-rear cross-section through a plane which, when positioned upon the member 12 appears in the orientation shown in FIG. 3. More particularly, ornament 32 more particularly includes a graphic displaying surface 34, said U-shaped geometry 36 and a bead-like integral element 38. As may be appreciated, the geometry of U-shaped portion 36 and bead 38 must be such so at to facilitate slip- or snap-fittable engagement into slot 34 and, more particularly, to facilitate engagement of bead-like element 38 into a slot 30 of serrated surface 28 of track 24.

In practice, a user of the present system would be provided, or would purchase, a variety of elements, such as ornaments 32, in accordance with graphics 34, that a user may have a personal interest or attachment.

In FIGS. 4-8 are shown a novel pivot connection between the eyeglass securing front frame portion 10 and the respective temple contacting side members 12 of the present system. More particularly, the inventive hinge connection includes an hinge carrier and enclosure assembly 40 which includes a hinge-facing engagement cavity 42 shown in phantom in FIG. 6 and in cross-sectional view in FIG. 7. As may be noted, the hinge carrier and enclosure 40 is integrally formed at distal end 14 of temple side members 12. The manner of integral formation thereof, typically by means of plastic molding may be more fully appreciated with reference to FIG. 9. As may be further noted in FIGS. 6 to 9, cavity 42 of hinge carrier 40 includes a transverse wall 44, this indicating that portion 46 of hinge carrier and enclosure 40 (see FIGS. 6, 8 and 9) is largely ornamental in nature.

With regard to the pivotal hinge connection between the temple side members 12 and eyeglass securing front frame 10 may be seen to include vertical hinge axle 48 is secured within the left and right outermost locations 50 and within said eyeglass securing front frame portion 10. About axle 48 is provided a journal 52 which integrally depends from rod 54 casing 56 is preferably formed of a polymeric plastic in which, co-axially positioned with said rod 54 is a compression spring 58. That is, the axial force of compression spring 58 is transmitted to rod 54 which in turn is transmitted to journal 52 which in turn controls the degree of circumferential friction between axle 48 and journal 52. Said screw 60 (see FIGS. 6 and 8) may be employed to secure the position of rod 54 within casing 56 at the time of manufacture. However, in an alternative embodiment, it may be employed to control the amount of linear spring force exerted by spring 58 against rod 54 to thereby control the amount of such force which is transmitted to said rod 54 and to journal 52.

In a further embodiment, ball-like element 62 may be used to stabilize compression spring 58 within casing 56 may take the form of a screw moveable along the axis of spring 58 and to thereby selectably increase or decrease the spring force which spring 58 will exert against distal end 64 of the rod 54.

Figure 8:
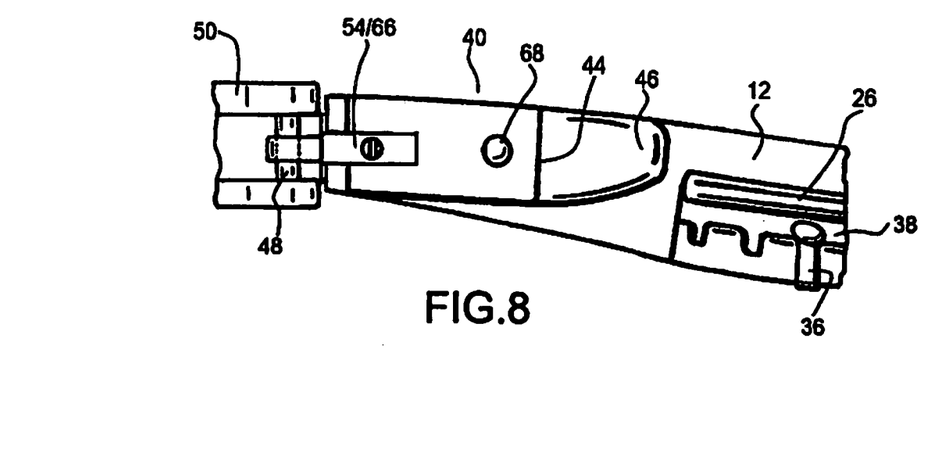
FIG. 8 is an assembly view showing the appearance of the inventive system at a hinge after hinge and casing shown to the left of FIG. 6 has been fully inserted into the hinge carrier shown to the right of FIG. 6.
Figure 9:
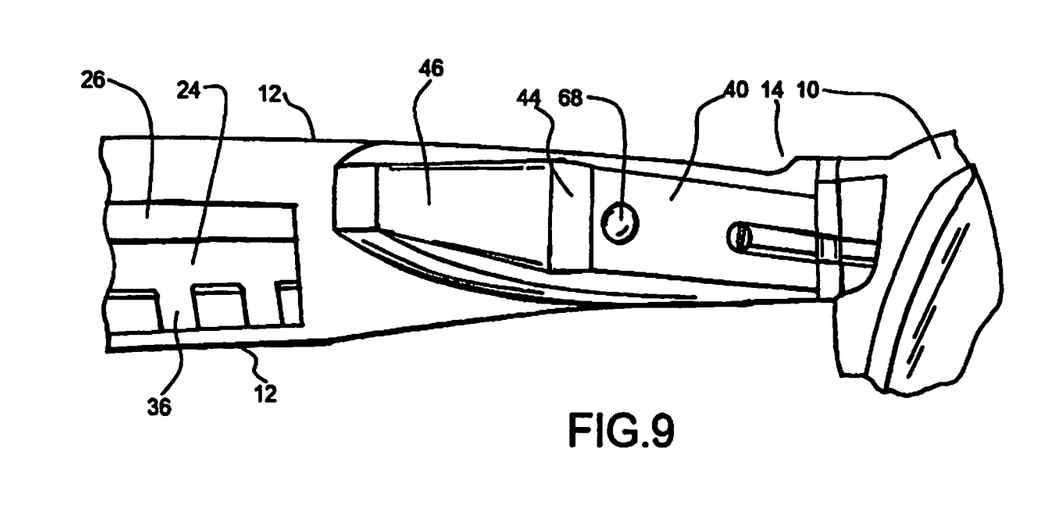
FIG. 9 is a side diagonal elevated view taken in the right to left direction of FIG. 8.
Figure 10:
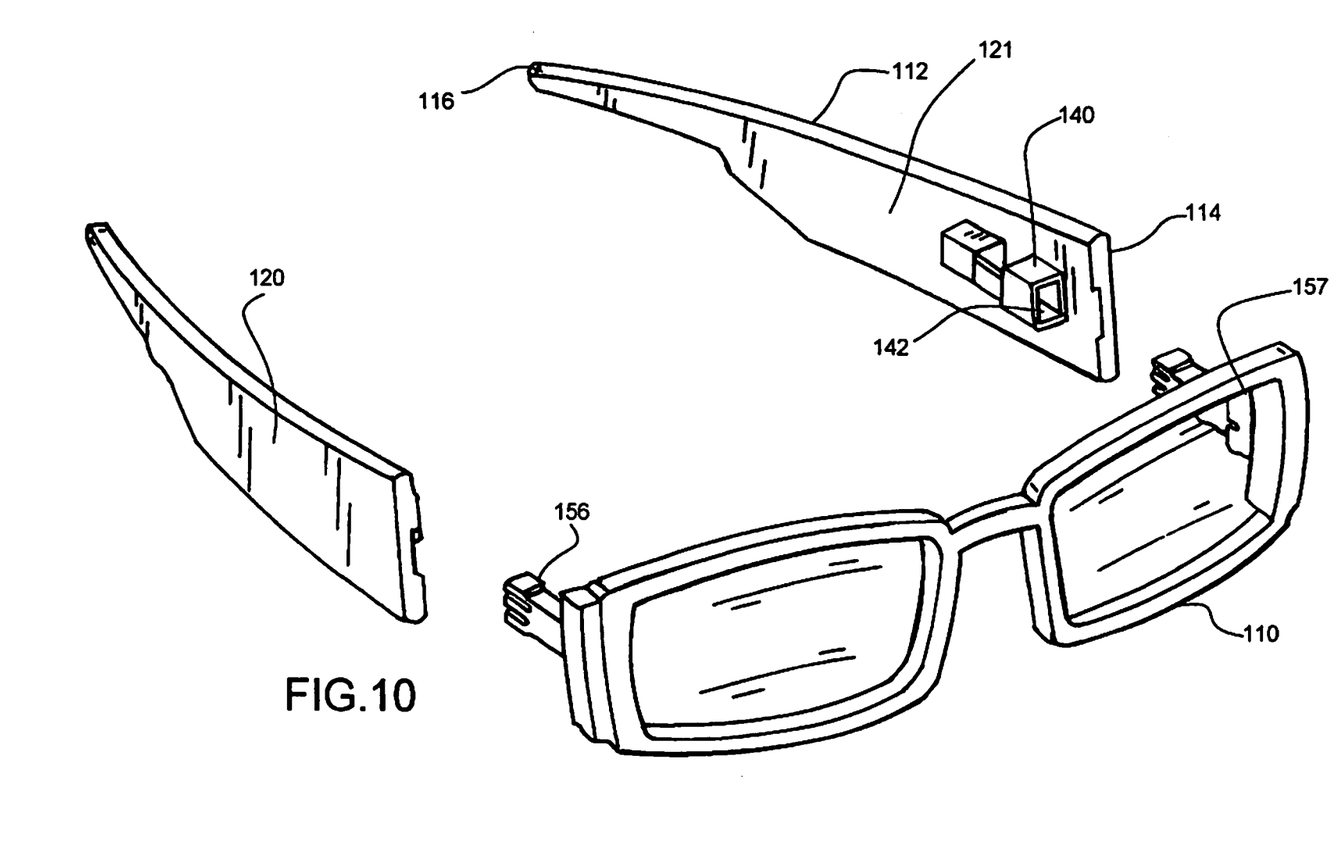
FIG. 10 is an exploded view of a second embodiment of the invention in which the arms of the eyeglass frame are pivotally connected to the glass-holding frame through the use of bayonet clips having one piece pivotally attached to the eyeglass frame portion of the system.
Figure 11:
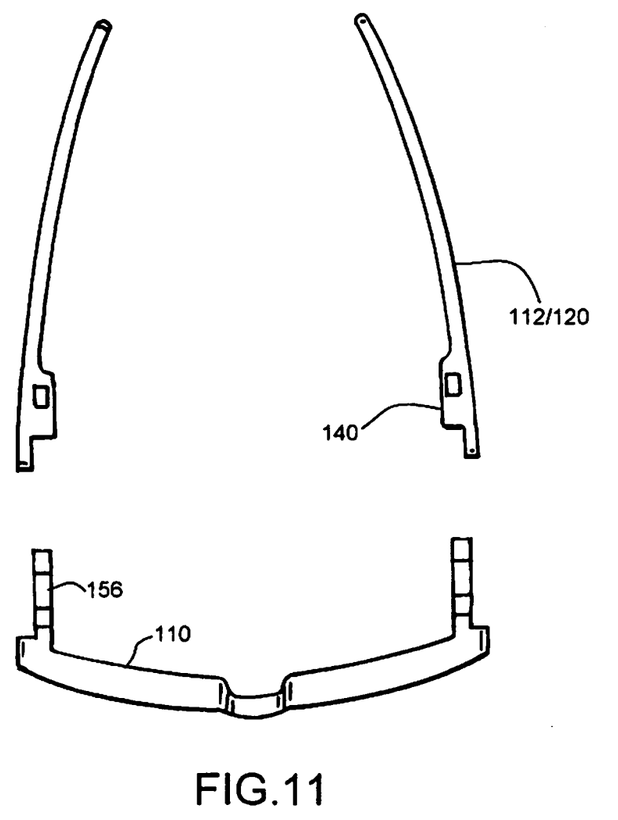
FIG. 11 is a top plan view of the view of FIG. 10.

A distinguishing feature of the instant invention is that casing 56 is proportioned for slip- or press-fittable complemental engagement within cavity 42 of hinge carrier 40, this including cut-out 56 which may engage a linear element in alignment with the outer side 20 of rod 54 to enhance stabilization of casing 56 when inserted within cavity 42 of the hinge carrier 40. Hinge carrier 40 is also preferably made of a translucent polymer such that the positioning of all elements of the carrier inclusive of ball-like element 62 and rod 54 may be rotationally confirmed. FIG. 8 shows the casing 56 of spring 58 and its associated rod 54, as well as journal 52 and axle 58, completely inserted within cavity 42 of hinge carrier 40. It should be appreciated that FIGS. 1, 5, 6 and 8 all are taken from the inside surface 18 of the temple-contacting side members 12. Resultant of the above structure, a user may selectably change both the side members, often referred to as arms, of the glasses frame by simply pulling casing 56 out of cavity 42, that is, the reverse of the insertion shown in FIG. 6.

Figure 12:
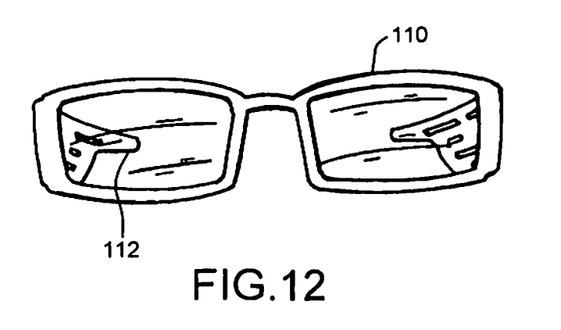
FIG. 12 is a front plan assembly view of the view of FIG. 11.

It finally is to be noted that a hole 68 (see FIGS. 6, 8 and 12) may be provided within the hinge carrier to provide for a snap fit of bead-like element 62 of casing 56 to the hinge carrier 60. As such, both linear cut-out 66 and hole 68 afford stability of casing 56 within cavity 42 when a given temple contacting side member 12 is selectably connected with the above described casing 56.

Figure 13:
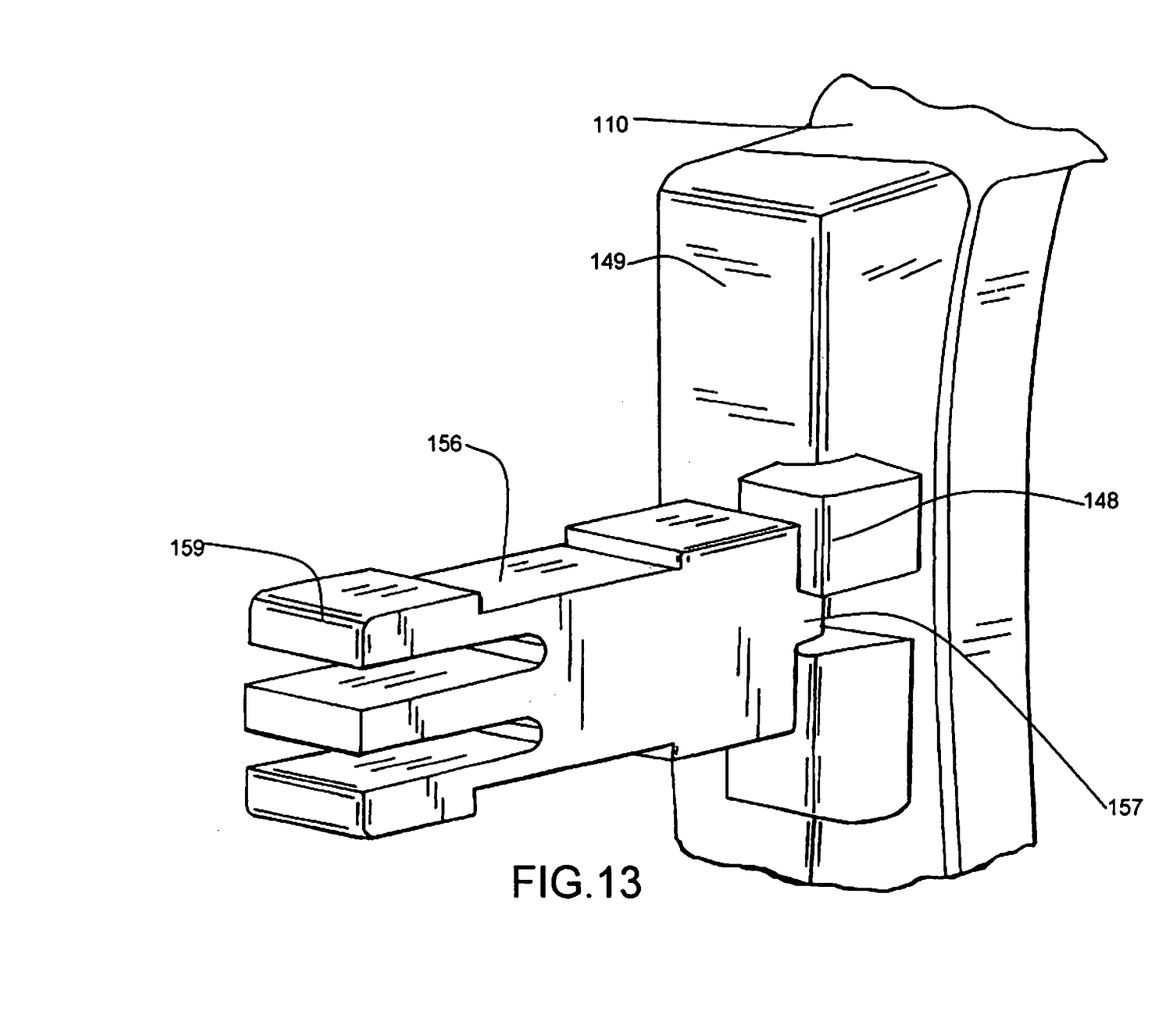
FIG. 13 is an enlarged view of the male element of the bayonet clip also showing the pivot point at its interface with the front of the eyeglass frame.
Figure 14:
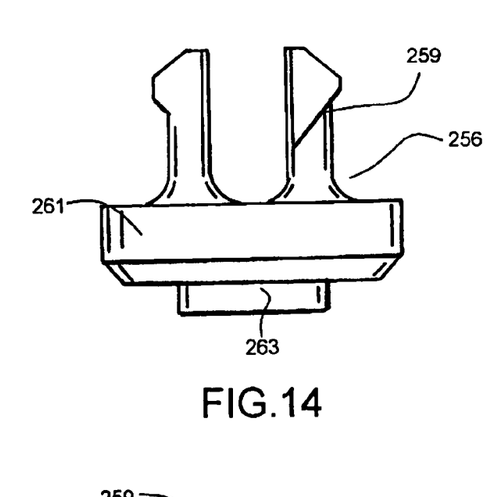
FIG. 14 is a side elevational view of a further embodiment of a bayonet clip which may be used in the manner shown in FIG. 13.
Figure 15:
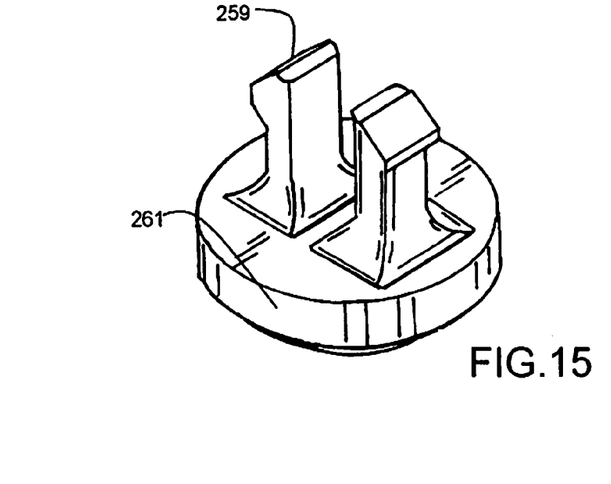
FIG. 15 is a diagonal perspective view of the male portion of the bayonet clip shown in FIG. 14.
Figure 16:
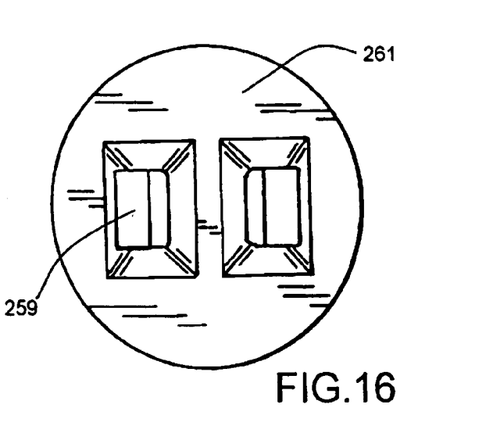
FIG. 16 is a top view of the structure of FIG. 14.
Figure 17:
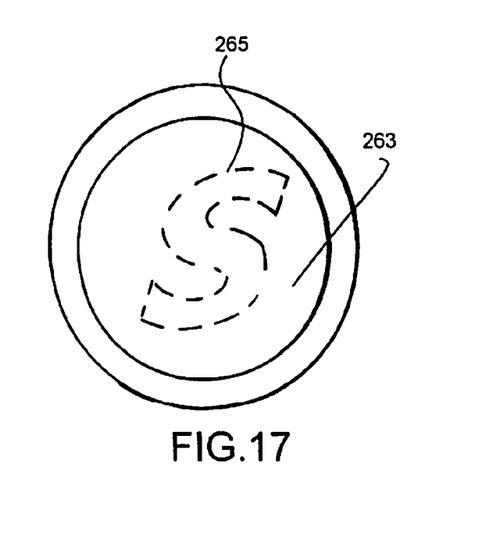
FIG. 17 is a bottom view of the structure of FIG. 14.

With reference to FIGS. 10-18, there is shown a further embodiment of the present invention which, more particularly, comprises a front eyeglass or sunglass securing front frame portion 110, a pair of temple contacting side members 112, each side member having a proximal end 114, a distal end 116, and an outer wall 120. The proximal end of each side member 112 includes a substantially hollow rectangular female element 140 integrally formed upon an inner wall 121 of side member 112. See also FIG. 11. The defining aspect of this embodiment may be more fully appreciated with reference to the view of FIG. 13 which illustrates a male element 156, constituting one portion of a bayonet type clip in which said female element 140 comprises the complemental portion thereof. Male element 156 includes a first end which is characterized by a journal 157 which engages a pivot axle 148 of inner surface 149 of the front eyeglass frame portion 110 of the inventive system. At the opposite end of male element 156 are prongs 159 which, in a bayonet clip, may assume various geometries as are shown in FIGS. 14-17. In other words, a bayonet clip may consist of either three prongs 159 as shown in FIG. 13 or two prongs 259 as are shown in FIGS. 14-16, and these prongs may be of different lengths. Where the number, length or geometry of the prongs 159/259 of the male element 156 or 256 differ, the interior reciprocal geometry of mouth 142 of female element 140 must of course be correspondingly modified to assure proper coupling between respective elements of the bayonet clip. At the proximal end of the bayonet clip, other means of attachment apart from journal 157 and axle 148 (see FIG. 13) may be used as is indicated by the s-shaped channel 265 shown in FIG. 17 [Max and Werner—this needs to be explained].

Figure 18:
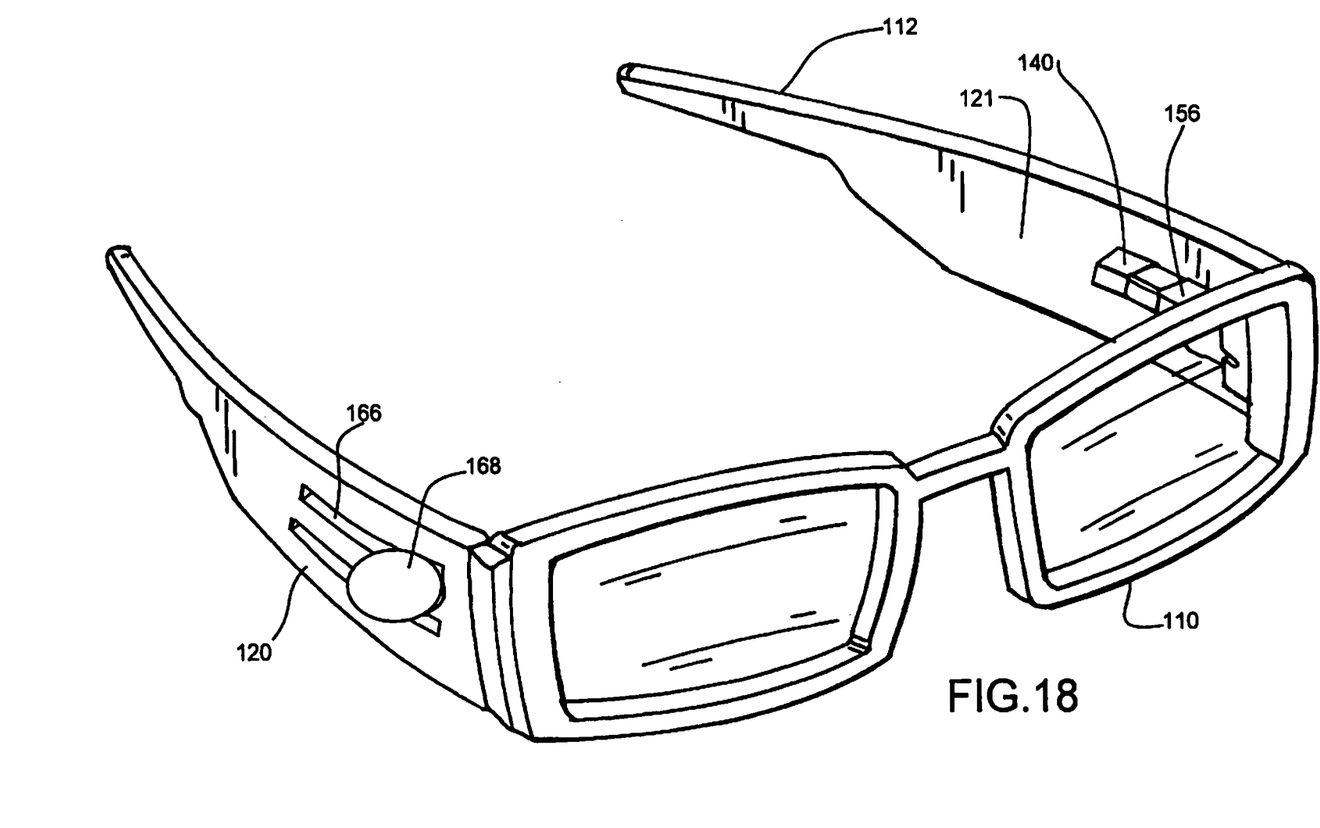
FIG. 18 is an assembly view of the exploded view of FIGS. 10 and 11 showing the male portion of the bayonet clip fully engaged within the female portion thereof.

An assembly view of the second embodiment of the invention is shown in FIG. 18. Therein the male and female elements of the bayonet clip may be seen secured to each other. The utility of this embodiment lies in the fact that the outer surfaces 120 (see FIGS. 10, 11 and 18) of the system may be provided with a selectable graphic. That is, a user will typically purchase the present product with a plurality of different arms 112, each having a different graphic on the outer side 120 thereof, such that any image, color, logo or design of interest may be employed. It is also to be appreciated that the outer surfaces 120 of side arms 112 of the second embodiment may, in similar fashion to that shown in the embodiment of FIGS. 1-9 above, be provided with a track of a similar nature through which logos 32/34 may be similarly employed. That is, the bayonet clip 156/140 above described may be employed as a complete substitute for the above-described male female mechanism 40/56.

As may be noted in FIG. 18, at least one side arm 112 may be provided with longitudinal slots 166 into which may be snap-fit charms 168 or the like, that are reflective of a theme of interest to the user. Such charms may be given an embodiment, resembling the male elements 261 of the bayonet clip shown in FIGS. 14-16, if the separation between prongs 259 corresponds to the separation between slots 166 of side arm 112.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

What is claimed is:

1. An eyeglass frame system, comprising:
   (a) an eyeglass securing front frame portion;
   (b) a pair of temple-contacting side members, each member having a proximal end and a distal end, the proximal end of each secured by a pivotal connection to a respective outermost side of said front frame portion, said side members having inner and outer vertical surfaces thereof, an inner surface of said side members defining a serrated track including female slots therein, said track substantially transverse to a plane of said eyeglass securing front frame portion and substantially co-linear with an axis defined by each of said temple-contacting side members, said track having an open end and a closed end, said open end directed toward a distal end of said at least one temple contacting member; and
   (c) at least one selectable ornament having a substantially U-shaped front-to-rear cross-section, an outer side of said ornament provided with a graphic of interest to a user of the system, said U-shaped cross-section proportioned for selectable insertion into said serrated track, an end of said ornament opposite said graphic provided with a geometry proportioned for press-fittable complemental engagement with a selectable one or more of said slots of said track, a width of said u-shaped ornament substantially complemental in dimension to that of a cross-section through said serrated track of at least one temple contacting member.

2. The system as recited in claim 1, said track defined by an upper elongate linear ridge disposed oppositely to a linear elongate structure including therein said slots,
   whereby at least one ornament may be selectably snap- or press-fitted into a selected slot of said serrated track.

3. The system as recited in claim 2, in which said pivotal connection of said proximal and said temple-contacting side members to said outer sides of said front frame portion, comprise:
   (a) a hinge carrier and an enclosure including a hinge engagement cavity integrally formed at a proximal end of each temple side member;
   (b) a vertical hinge axle provided within each outermost side of said front frame portion of the eyeglass system;
   (c) a rod including, at a proximal end thereof, an axle-engaging journal, said journal disposed in rotational relationship about said hinge axle;
   (d) a compression spring disposed co-axially with said rod, said spring having a proximal end and abutment with a distal end of said rod, thereby receiving a compression force exerted by said spring; and
   (e) an elongate casing within which said spring and at least a distal part of said rod are embedded, and to which a distal end of said spring is secured in which that force supplied by said spring to said rod and, in turn, to said collar of said axle is defined by properties of said spring and the degree of compression effected by a transverse distally located end surface within said cavity, further in which an exterior geometry of said casing is proportioned for press-fittable complemental engagement within said engagement cavity of said hinge carrier at the proximal end of each temple member, whereby said hinge carrier and enclosure integrally associated temple side member may be selectably changed by press-fittable disengagement of said elongate casing from said hinge carrier enclosure of each temple side member may be by press-fittable disengagement of said elongate casing from said hinge carrier enclosure of each temple side member.

4. The system as recited in claim 3, further comprising:
means for increasing or decreasing the amount of linear force upon said compression spring within said casing to thereby control pressure of said rod upon said axle-engaging journal.

5. The system as recited in claim 2, further comprising:
a said screw passing through a wall of said casing to provide selectable pressure against said rod.

6. An eyeglass frame system, comprising:
(a) an eyeglass securing front frame portion;
(b) a pair of temple-contacting side members, each member having a proximal end and a distal end, the proximal end of each secured by a pivotal connection to a respective outermost side of said front frame portion, said side members having inner and outer vertical surfaces thereof;
(c) a pair of bayonet clips each comprising a male element and a complemental female element, each male element having a first end and a second end, a pivotal connection existing between said first end of said male element and a complementally engaging pivotal means integrally formed proximally to inner edges of lateral sides of said front frame portion, said second end of each male element comprising a plurality of integrally formed prongs, said female elements integrally formed within said inner vertical surface of said member near a proximal end of each side member, in which at least one of said inner surfaces of said side members defines a serrated track including female slots therein, said track substantially transverse to a plane of said eyeglass securing front frame portion and substantially co-linear with an axis defined by each of said temple-contacting side members, said track having an open end and a closed end, said open end directed toward a distal end of said at least one temple contacting member; and
(d) at least one selectable ornament having a substantially U-shaped front-to-rear cross-section, an outer side of said ornament provided with a graphic of interest to a user of the system, said U-shaped cross-section proportioned for selectable insertion into said serrated track, an end of said ornament opposite said graphic provided with a geometry proportioned for press-fittable complemental engagement with a selectable one or more of said slots of said track, a width of said U-shaped ornament substantially complemental in dimension to that of a cross-section through said serrated track of said at least one temple contacting member,
whereby said male and female elements of the bayonet clips may be selectably engaged or disengaged from each other by the application of pressure on sides of the male element transversely to the axis of the side member with which the bayonet clip is associated.

7. The system as recited in claim 6, in which the outer vertical surface of said side members includes a graphic color, logo, or message of interest to a user of the system.

8. The system as recited in claim 6, said track defined by an upper elongate linear ridge disposed oppositely to a linear elongate structure including therein said slots.

9. The system as recited in claim 6, in which at least one temple-contacting side member includes at least one pair of longitudinal slots into which complemental members integral with an outer charm face containing a graphic may be snap-fit.

* * * * *